(12) United States Patent
Beever

(10) Patent No.: US 6,243,640 B1
(45) Date of Patent: Jun. 5, 2001

(54) VEHICLE BRAKE CONTROL

(75) Inventor: Paul Adrian Beever, Solihull (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/380,000

(22) Filed: Aug. 24, 1999

(30) Foreign Application Priority Data

Sep. 9, 1998 (GB) .................................................. 9819519

(51) Int. Cl.⁷ ................................................. B60K 31/04
(52) U.S. Cl. .............................. 701/70; 701/93; 180/179; 123/352
(58) Field of Search .................................... 701/70, 93, 94, 701/95, 96, 97; 123/350, 352; 180/170, 176, 177, 178, 179, 197

(56) References Cited

U.S. PATENT DOCUMENTS

| 4,171,030 | * | 10/1979 | Ruhl ...................................... 180/179 |
| 4,493,303 | * | 1/1985 | Thompson et al. .................. 123/352 |
| 4,569,239 | * | 2/1986 | Shirley et al. ........................ 180/179 |
| 4,656,407 | * | 4/1987 | Burney .................................. 180/178 |
| 4,771,848 | * | 9/1988 | Namba et al. ........................ 180/197 |
| 4,849,892 | * | 7/1989 | McCombie ............................ 180/178 |
| 4,860,210 | * | 8/1989 | McCombie ............................ 123/352 |
| 4,969,531 | * | 11/1990 | Hirakata et al. ...................... 180/179 |
| 5,155,687 | * | 10/1992 | Katayama ............................ 123/352 |
| 6,081,762 | * | 6/2000 | Richardson et al. .................... 701/93 |

FOREIGN PATENT DOCUMENTS

| 37 36 807 A1 | 5/1989 | (DE) . |
| 38 40 564 A1 | 3/1990 | (DE) . |
| 196 37 297 A1 | 3/1998 | (DE) . |
| 198 17 212 A1 | 10/1998 | (DE) . |
| 2 308 415 | 6/1997 | (GB) . |
| 2 319 636 | 5/1998 | (GB) . |

* cited by examiner

Primary Examiner—Gary Chin
(74) Attorney, Agent, or Firm—Davis & Bujold, P.L.L.C.

(57) ABSTRACT

An automatic brake control system for a vehicle in which the brakes, are controlled by a control unit to limit vehicle speed to a target speed when descending a hill. The control unit is arranged to control the vehicle speed so that, as the vehicle speed approaches the target speed, the rate of change of acceleration of the vehicle does not exceed a predetermined value.

8 Claims, 5 Drawing Sheets

VEHICLE BRAKE CONTROL

FIELD OF THE INVENTION

The invention relates to control of a vehicle braking system, and in particular to the use of the braking system to control the descent of hills by the vehicle. It is particularly useful for off-road vehicles.

BACKGROUND TO THE INVENTION

It is known from WO 96/11826 to provide a brake control system for a vehicle in which the brakes are automatically controlled so as to limit the vehicle speed to a predetermined value, the target speed, such that, with the help of an anti-lock brake function, the descent of a steep hill can be controlled without the need for skilled inputs from the driver.

It can be a problem with such a system, when it is first actuated, to control the vehicle speed smoothly as it approaches the target speed. It is known from GB2319636 to provide a system in which a control speed is ramped downwards from an initial value which is higher than the instantaneous vehicle speed towards the target speed, which is lower than the instantaneous vehicle speed. However problems can still occur in providing a smooth transition when the control speed reaches the instantaneous vehicle speed.

SUMMARY OF THE INVENTION

The present invention provides a braking system for a vehicle, the system comprising brakes, a vehicle speed sensor for measuring the speed of the vehicle, and a controller having a target speed and a maximum rate of change of acceleration defined therein and being arranged to control application of the brakes so as to bring the speed of the vehicle towards the target speed, wherein the controller is arranged, as the vehicle speed approaches the target speed, to control the vehicle brakes so that the magnitude of the rate of change of acceleration of the vehicle does not exceed said maximum rate of change of acceleration.

The term rate of change of acceleration is used herein to mean a rate of change of positive acceleration or a rate of change of negative acceleration, and negative acceleration is referred to as deceleration where this improves clarity.

The maximum value can be the same whether the vehicle is accelerating towards the target speed or decelerating towards the target speed.

The present invention further provides a method of controlling the brakes of a vehicle so as to bring the vehicle speed towards a target speed, the method comprising the steps of defining a maximum rate of change of acceleration, measuring the rate of change of acceleration of the vehicle, and controlling the brakes so that the magnitude of said rate of change of acceleration of the vehicle so that it does not exceed said predetermined maximum value.

An embodiment of the invention will now be described by way of example and with reference to the accompanying drawings.

DESCRIPTION OF THE PREFERRED EMBODIMENTS

Figure 1:
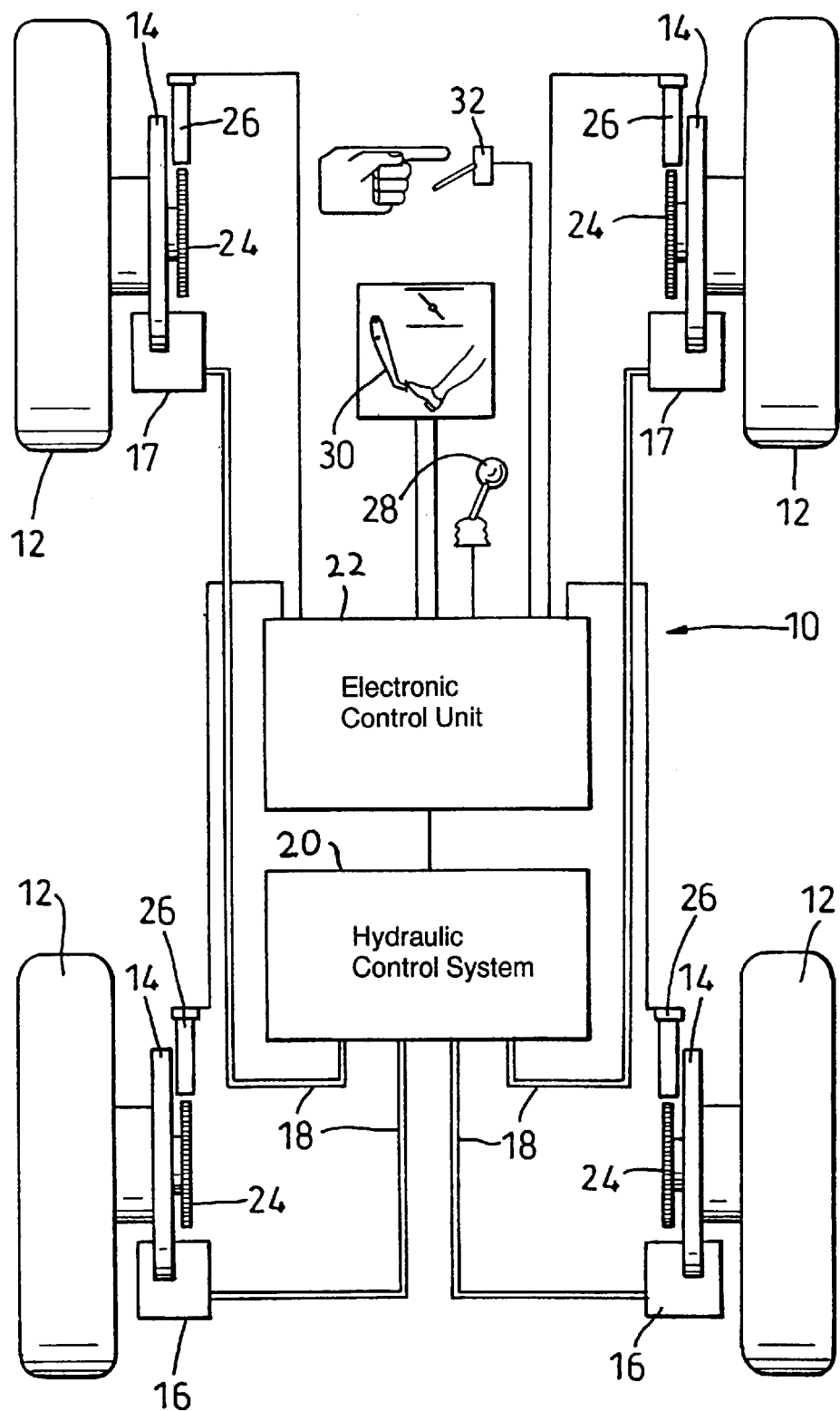
FIG. 1 is a schematic diagram of a vehicle according to the invention.

As shown in FIG. 1, the vehicle 10 includes four wheels 12. Each wheel 12 is provided with a co-rotating brake disc 14 which is acted upon by a brake calliper 16. The brake callipers 16 are hydraulically operated and a hydraulic line 18 leads from each brake calliper to a hydraulic brake control system 20 which includes a hydraulic pump and valves so that it can increase and decrease the braking pressure independently of the position of the brake pedal. The hydraulic brake control system 20 is controlled by an electronic control unit 22.

Each wheel 12 also carries a co-rotating toothed wheel 24. An inductive sensor 26 is provided adjacent each toothed wheel 24 and provides a signal to the electronic control unit 22 in the form of a regular wave form voltage, the frequency of which is indicative of the wheel speed.

The accelerator pedal 30 has a continuously variable sensor in the form of a potentiometer associated with it which provides an analogue signal to the electronic control unit 22 which is dependent upon the position, or angle, of the accelerator pedal.

A manually operable switch 32 is also connected to the electronic control unit 22.

In use, the vehicle is driven normally when the switch 32 is switched off. Under these conditions the electronic control unit 22 operates the antilock braking function to prevent locking of the wheels if the driver brakes using the brake pedal 34. Also traction control is provided by the control unit 22. Both of these functions are carried out in known manner by monitoring the speed and acceleration of each wheel and a detected vehicle speed calculated from the speeds of all the wheels. The detected vehicle speed is calculated by using an average of all the wheel speeds, but ignoring the speeds of any wheels which are detected as locked or spinning. Locked wheels will be released by releasing braking pressure using the anti-lock valves in the hydraulic control unit 20, and spinning wheels will be slowed by applying a braking pressure from the pump.

When the activation switch 32 is switched on by the driver to select hill descent mode, the electronic control unit takes active control of the vehicle's speed, controlling the application and release of the brakes to limit the vehicle's speed. If the accelerator pedal 30 is fully released the control unit maintains the vehicle speed at a minimum target speed, or threshold speed, which can depend on the gradient of the slope which the vehicle is descending or the gear in which the vehicle transmission is operating. If the accelerator pedal 30 is depressed, the target speed is increased above the minimum value by an amount determined by the amount of depression of the pedal 30.

Figure 2:
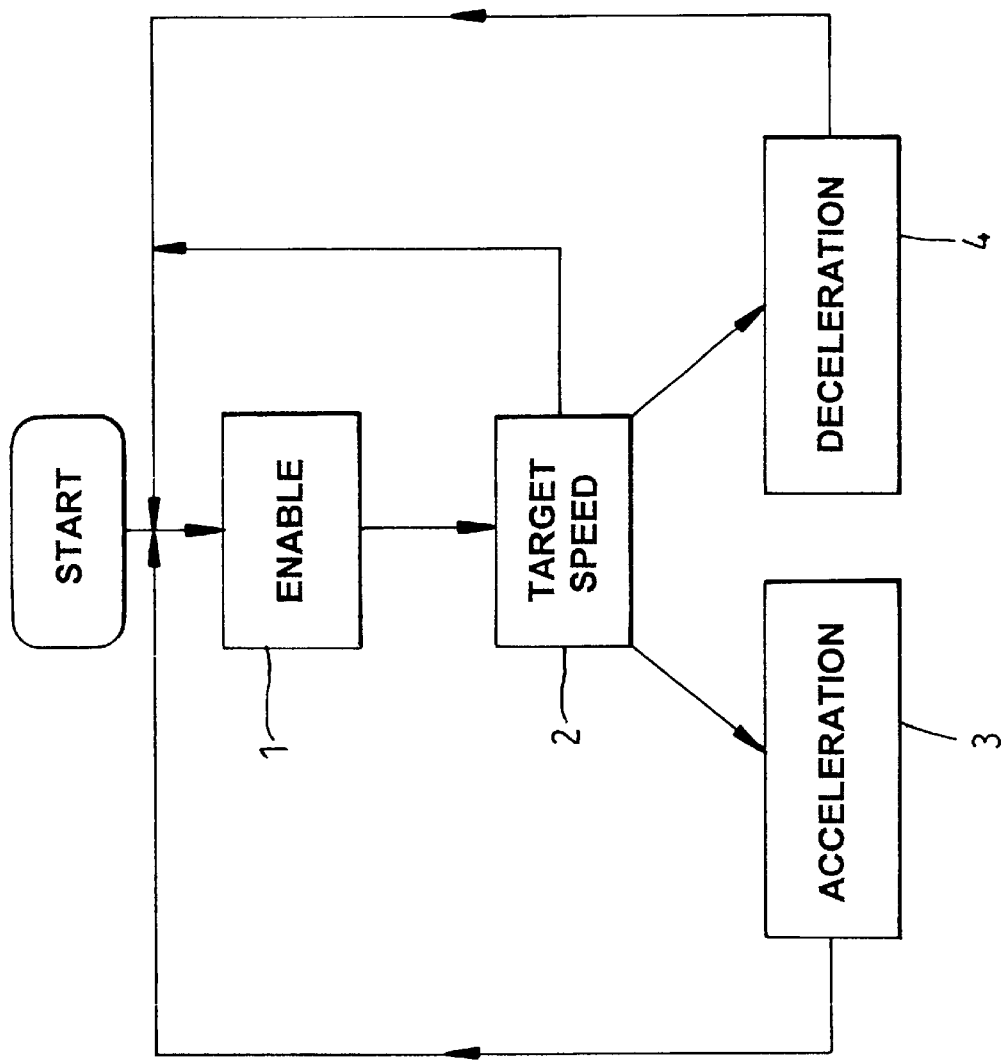
FIG. 2 is a flow diagram showing the operation of the vehicle of FIG. 1.

With reference to FIG. 2, at the simplest level, when the system is activated by the driver using the switch 32, the control unit enables the hill descent control system at step 1. It then proceeds to step 2 where it compares the instantaneous measured vehicle speed $v_m$ with the target speed $v_t$. If these are the same the system returns to the start. If they are different it proceeds either to step 3 to accelerate the vehicle, as described below with reference to FIGS. 3 and 4, or to step 4 to decelerate the vehicle, as described below with reference to FIGS. 5 and 6, and then returns to the start.

Figure 3:
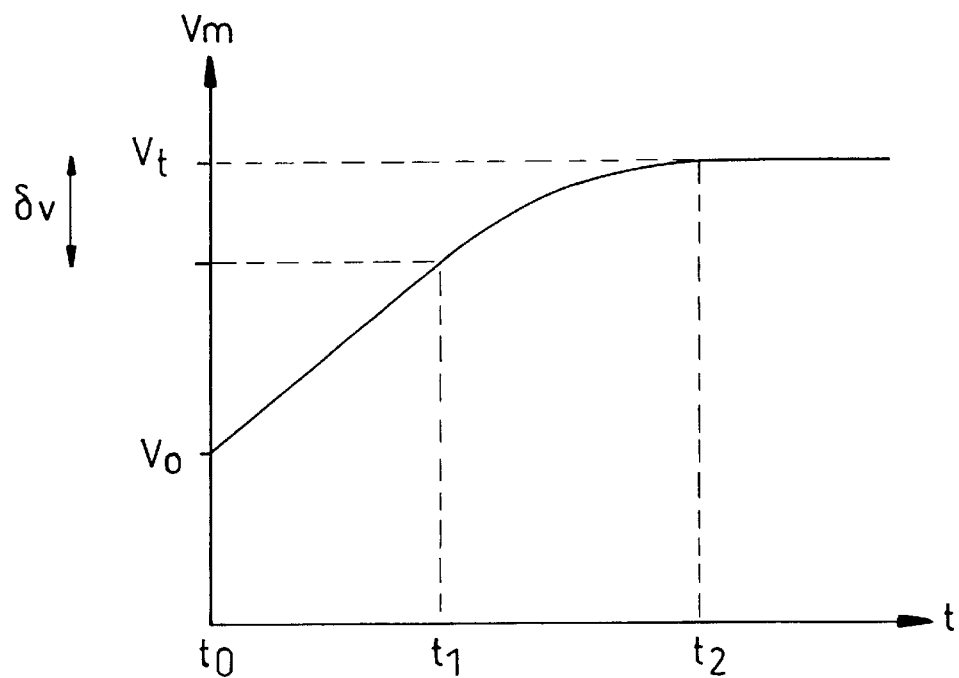
FIG. 3 is a graph showing controlled changes in speed of the vehicle of FIG. 1 during acceleration.

Referring to FIG. 3, if the control unit determines that the measured speed $v_m$ is significantly below the target speed $v_t$ at a time $t_0$ it is arranged to allow the vehicle to accelerate towards the target speed $v_t$ at up to a maximum acceleration rate $a_{max}$ and then from time $t_1$ to gradually reduce the acceleration rate to zero as the vehicle speed $v_m$ approaches the target speed $v_t$, which it reaches at time $t_2$. The rate of change of acceleration, referred to herein as the jerk rate, is limited to a predetermined maximum magnitude of, for example, 2 ms$^{-3}$. This ensures that the transition from acceleration towards the target speed to maintaining the target speed is relatively smooth. The instantaneous speed $v_m$ at which the acceleration rate starts to be reduced is calculated from the instantaneous acceleration rate $a_m$ and the maximum jerk rate J and is given by $v_t - v_m = a_m^2/2J$.

Figure 4:
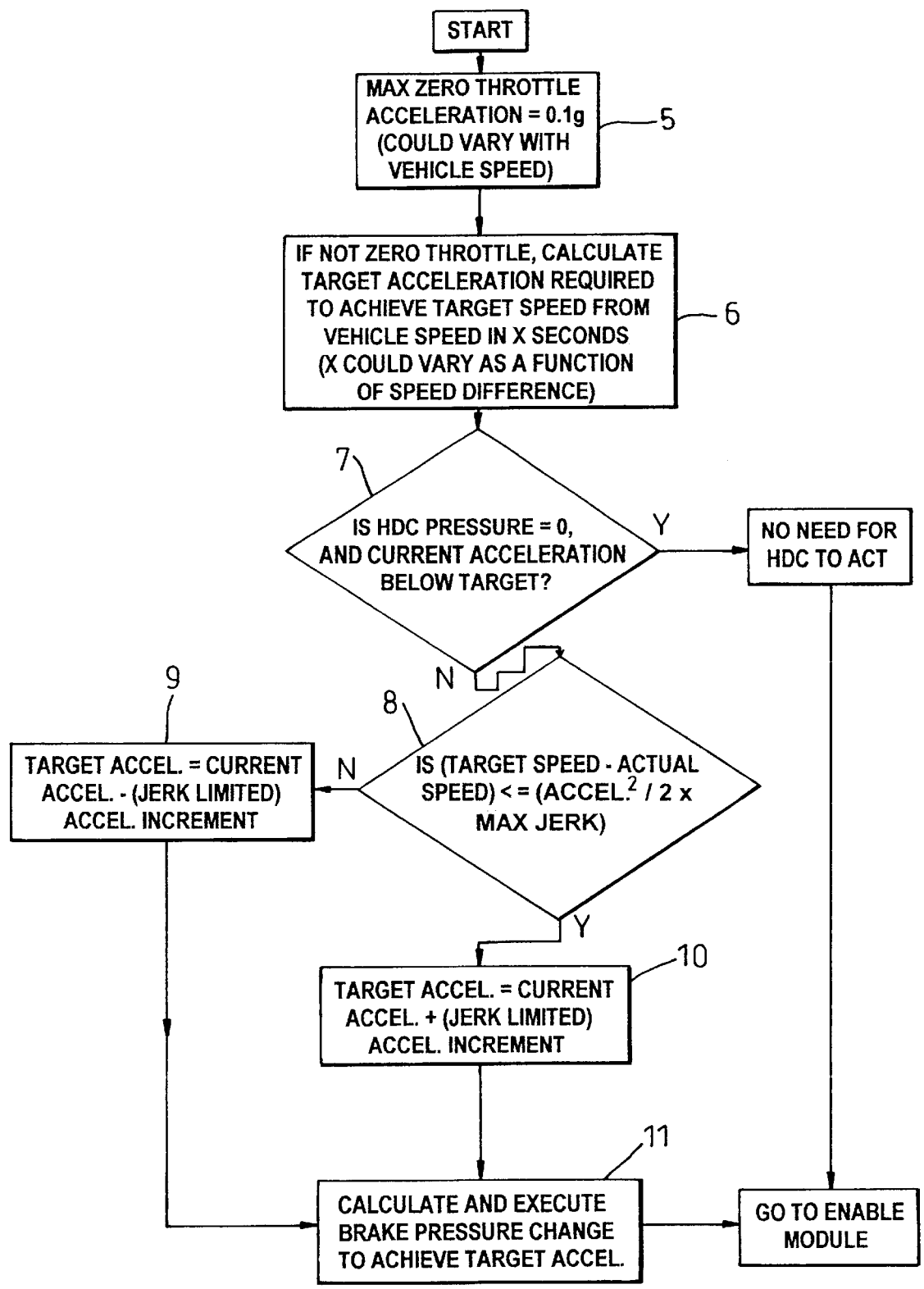
FIG. 4 is a flow diagram illustrating the operation of the control unit of the vehicle of FIG. 1 during acceleration.

Referring to FIG. 4, once the control unit has determined that acceleration is required, it proceeds to step 5 where a maximum acceleration rate is set at 0.1 g (where g is the acceleration due to gravity, i.e. 9.8 ms$^{-2}$). It then proceeds to step 6 where the instantaneous vehicle speed $v_m$ is compared with the target speed $v_t$, as determined by the position of the throttle pedal, and a target acceleration rate at set which will achieve the target speed within a set time. This time can be made dependent on the difference between instantaneous speed and target speed so that, where the difference is large, the target acceleration rate does not exceed a desirable maximum. Where the difference is small a target acceleration which is lower than the maximum can be used. Then at step 7 the brake pressure being produced by the hill descent control system is checked. If it is zero, i.e. the hill descent control system is not currently active, and the instantaneous vehicle acceleration is less than the target acceleration, i.e. there is no need for increased braking, then there is no need for the system to act, and it returns to step 1. If either the system brake pressure is not zero or the instantaneous vehicle acceleration is more than the target acceleration, then the system does need to act, and proceeds to step 8, where the difference ($v_t - v_m$) between the instantaneous vehicle speed and the target speed is checked. Provided this speed difference is larger than a predetermined amount δv the control unit 22 proceeds to step 9 where a target acceleration at is set at the instantaneous measured acceleration $a_m$ plus an increment δa, or the maximum acceleration $a_{max}$, whichever is the lower. The value of δa is determined from the minimum time which will elapse between incremental increases in acceleration, and a maximum jerk rate J of 2 ms$^{-3}$. If the speed difference ($v_t - v_m$) is less than the predetermined amount δv, this indicates that the vehicle speed is approaching the target speed and the vehicle acceleration needs to be reduced gradually towards zero. The control unit 22 proceeds to step 10 where a target acceleration $a_t$ is set at the instantaneous measured acceleration $a_m$ minus a decrement δa which is determined in the same way as the increment δa so as to provide the desired jerk rate. When it has been determined at step 9 or 10 what the increment or decrement in acceleration should be, the system proceeds to step 11 where the change in brake pressure required to produce that change is calculated and produced. The system then returns to step 1.

Figure 5:
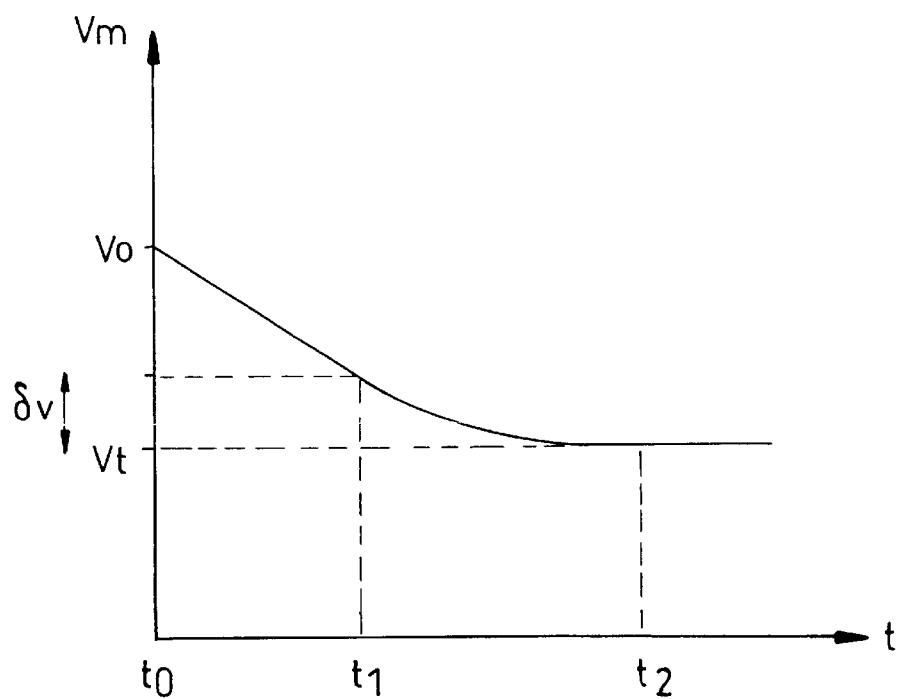
FIG. 5 is a graph showing controlled changes in speed of the vehicle of FIG. 1 during deceleration.

Referring to FIG. 5, if the control unit determines that the measured speed $v_m$ is significantly above the target speed $v_t$ at a time $t_0$ it is arranged to decelerate the vehicle towards the target speed $v_t$ at up to a maximum deceleration rate $a_{max}$ up to time $t_1$ and then to gradually reduce the deceleration rate to zero as the vehicle speed $v_m$ approaches the target speed $v_t$, Which it reaches at time $t_2$. The rate of change of deceleration, also referred to herein as the jerk rate, is, like the rate of change of acceleration, limited to a predetermined maximum value of, for example, 2 ms$^{-3}$ to ensure smooth operation.

Figure 6:
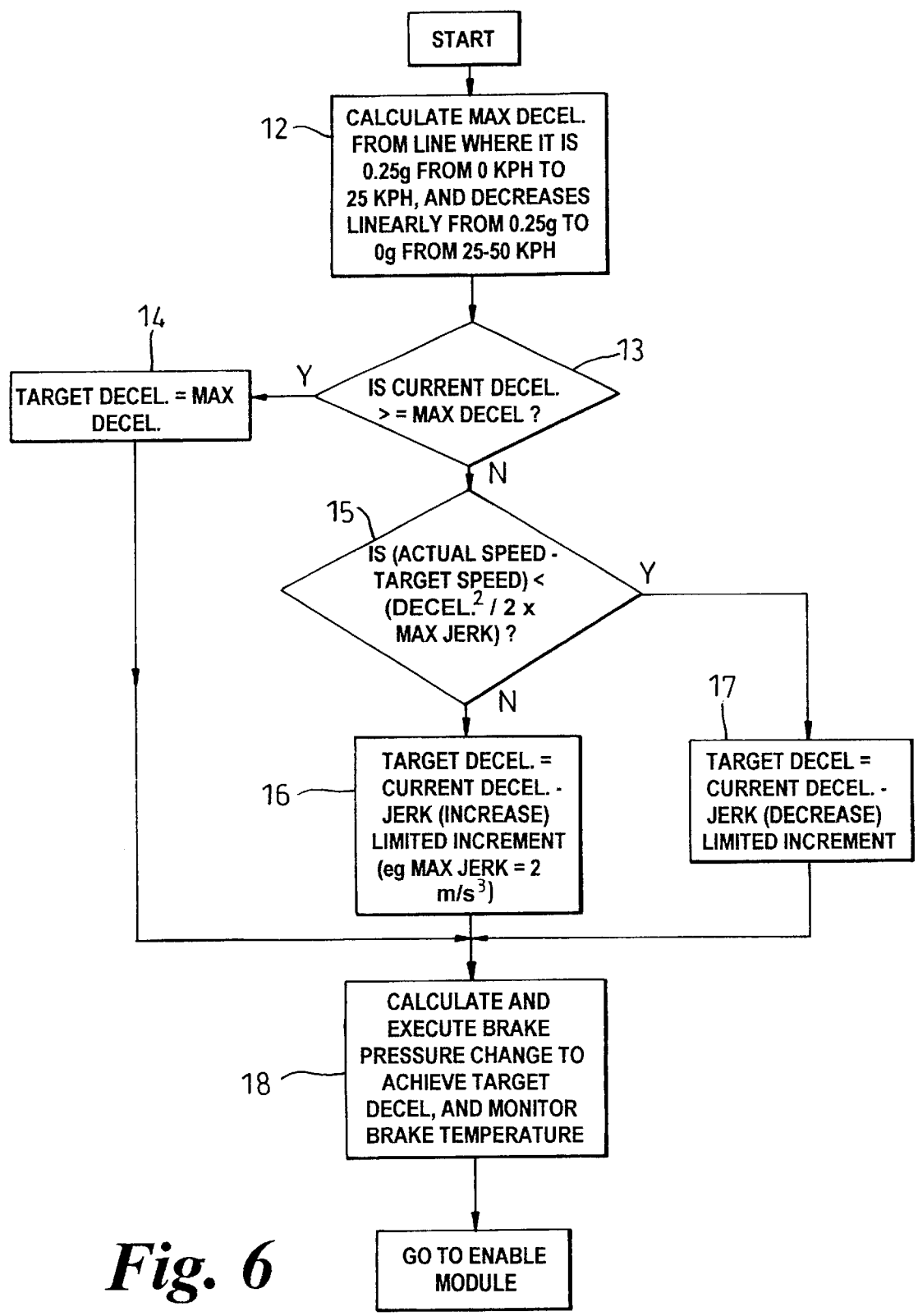
FIG. 6 is a flow diagram illustrating the operation of the control unit of the vehicle of FIG. 1 during deceleration.

Referring to FIG. 6 if the control unit determines at step 2 that deceleration is required, it proceeds to step 12 where a maximum deceleration rate is set which is speed dependent, in this instance being constant at 0.25 g over speeds from 0 to 25 kph and then decreasing linearly to 0 g at 50 kph. At speeds higher than 50 kph the hill descent system is not operational. Then at step 13 the instantaneous measured deceleration $a_m$ is compared with the maximum deceleration $a_{max}$. If it is higher a target deceleration rate at is set at step 14 which is equal to the maximum deceleration rate. This is so even if this results in a jerk rate which exceeds the desired maximum jerk rate. This ensures that the system will not maintain an excessive deceleration which may have been caused by external influences, and may already have produced a jerk rate higher than the desired maximum. If the instantaneous measured deceleration $a_m$ is lower than the maximum deceleration $a_{max}$, at step 15 the difference ($v_m - v_t$) between the instantaneous measured vehicle speed $v_m$ and the target speed $v_t$ is checked. Provided this speed difference ($v_m - v_t$) is larger than a predetermined a mount δv the control unit 22 proceeds to step 16 where a target deceleration at is set at the instantaneous measured deceleration $a_m$ plus an increment δa. The value of δa is determined in the same way as at step 10 during acceleration. If the speed difference ($v_m - v_t$) is less than the predetermined amount δv, this indicates that the vehicle speed is approaching the target speed and the vehicle deceleration needs to be reduced gradually towards zero. The control unit 22 proceeds to step 17 where a target deceleration at is set at the instantaneous measured deceleration $a_m$ minus a decrement δa which is determined in the same way as the increment δa so as to provide an acceptable jerk rate. When it has been determined at step 14, 16 or 17 what the increment or decrement in deceleration should be, the system proceeds to step 18 where the change in brake pressure required to produce that change is calculated and produced. The system then returns to step 1.

What is claimed is:

1. A braking system for a vehicle, the system comprising brakes, a vehicle speed sensor for measuring a vehicle speed, and a controller having a target speed and a maximum rate of change of acceleration defined therein and being arranged to control application of the brakes so as to bring the vehicle speed towards the target speed, wherein the controller is arranged, as the vehicle speed approaches the target speed, to control the vehicle brakes so that the rate of change of acceleration of the vehicle does not exceed said maximum rate of change of acceleration.

2. A system according to claim 1 wherein the controller is arranged to monitor the vehicle speed as the vehicle speed approaches the target speed, to determine, on the basis of said maximum rate of change of acceleration, when a reduction in the vehicle's acceleration rate needs to commence in order for the vehicle's acceleration rate to reach zero when the target speed is reached, and to start reducing the vehicle's acceleration rate at that time.

3. A system according to claim 1 wherein the controller is arranged to monitor the vehicle's instantaneous acceleration rate and if the vehicle's instantaneous acceleration rate is higher than a maximum acceleration rate, to reduce the vehicle's instantaneous acceleration rate towards said maximum acceleration rate.

4. A system according to claim 2 wherein the controller is arranged to reduce the vehicle's acceleration rate at said maximum rate of change of acceleration.

5. A method of controlling a set of brakes of a vehicle to bring a vehicle speed towards a target speed using a vehicle braking system, said braking system comprising brakes, a vehicle speed sensor for measuring the vehicle speed, and a controller coupled to the brakes and the vehicle speed sensor, the method comprising the steps of:

measuring with the speed sensor a rate of change of acceleration of the vehicle, said rate of change having a magnitude; and controlling the brakes so that the magnitude of the rate of change of acceleration of the vehicle does not exceed a maximum rate of change of acceleration.

6. The method according to claim 5 further comprising the steps of:

monitoring the vehicle speed as the vehicle speed approaches the target speed;

determining, from the maximum rate of change of acceleration, a time when a reduction in a vehicle acceleration rate needs to be commenced in order for the vehicle acceleration rate to reach zero when the target speed is reached; and starting to reduce the vehicle acceleration rate at said time.

7. The method according to claim 5 further comprising the steps of:

defining in said controller a maximum acceleration rate;

monitoring a vehicle instantaneous acceleration rate; and reducing the vehicle instantaneous acceleration rate towards said maximum acceleration rate if the vehicle instantaneous acceleration rate is higher than said maximum acceleration rate.

8. The method according to claim 6 further comprising the step of reducing the vehicle acceleration rate at said maximum rate of change of acceleration.

\* \* \* \* \*